(12) United States Patent
Milner

(10) Patent No.: US 7,125,359 B2
(45) Date of Patent: Oct. 24, 2006

(54) CONTINUOUSLY VARIABLE TRANSMISSION DEVICE

(75) Inventor: Peter James Milner, deceased, late of Leicestershire (GB); by Kirsten Milner, legal representative, Leicestershire (GB)

(73) Assignee: Orbital Traction Ltd., Leicestershire (GB)

( * ) Notice: Subject to any disclaimer, the term of this patent is extended or adjusted under 35 U.S.C. 154(b) by 4 days.

(21) Appl. No.: 10/488,821

(22) PCT Filed: Sep. 6, 2002

(86) PCT No.: PCT/GB02/04065

§ 371 (c)(1),
(2), (4) Date: Apr. 28, 2004

(87) PCT Pub. No.: WO03/023256

PCT Pub. Date: Mar. 20, 2003

(65) Prior Publication Data

US 2004/0248689 A1    Dec. 9, 2004

(30) Foreign Application Priority Data

Sep. 8, 2001    (GB) ................................ 0121739.7

(51) Int. Cl.
*F16H 15/50*    (2006.01)

(52) U.S. Cl. .................................... 475/185

(58) Field of Classification Search ................ 475/185, 475/186, 195, 183
See application file for complete search history.

(56) References Cited

U.S. PATENT DOCUMENTS

| 2,209,497 | A | * | 7/1940 | Winger et al. | 475/185 |
| 3,516,305 | A | * | 6/1970 | Chery | 475/185 |
| 3,618,423 | A | * | 11/1971 | Chery | 475/186 |
| 3,670,595 | A | * | 6/1972 | Chery | 475/186 |
| 3,793,910 | A |   | 2/1974 | Nasvytis | 475/185 |
| 4,158,317 | A | * | 6/1979 | James | 475/185 |
| 4,424,726 | A | * | 1/1984 | Galbraith | 475/185 |

FOREIGN PATENT DOCUMENTS

| DE | 560276 | 9/1932 |
| WO | 99/35417 | 7/1999 |

* cited by examiner

*Primary Examiner*—Sherry Estremsky
(74) *Attorney, Agent, or Firm*—Gifford, Krass, Groh, Sprinkle, Anderson & Citkowski, P.C.

(57) ABSTRACT

A continuously variable transmission device of the type having planetary members in rolling contact with radially inner and outer races each comprising axially spaced relatively axially movable parts, and control means for determining the axial separation of the parts of one of the two races, in which the planets are connected for planetary motion to a planet carrier by connection means which allows the radial position of the planets to vary in response to variation in the axial separation of the parts of the said one of the two races while maintaining the circumferential connection.

49 Claims, 6 Drawing Sheets

CONTINUOUSLY VARIABLE TRANSMISSION DEVICE

FIELD OF THE INVENTION

The present invention relates to an improved continuously variable transmission device.

BACKGROUND OF THE INVENTION

In particular, the present invention relates to a continuously variable transmission device of the type having planetary members in rolling contact with radially inner and outer races each comprising two axially spaced parts, with control means for selectively varying the axial separation of the two parts of one race and thus the radial position of the planetary members in rolling contact therewith. Such a transmission device may have means sensitive to the torque applied to one of two drive-transmitting members of the transmission (namely the input and output shafts) to determine the compensating variation in the separation of the two parts of the other race and thus the transmission ratio of the device, and also to vary the forces exchanged between the planets and the races normal to the interface between them. The rolling contact between the planetary members and the races is lubricated by means of a very thin film of lubricant. It is essential that this thin film of lubricant be present in order to prevent dry frictional contact between the members in relative motion, which would lead to premature wear, but also that such film should be extremely thin in order to avoid relative slippage.

It is an important design criterion that a transmission device should be most efficient in the transmission ratio most used, that is used for the greatest amount of the time. All transmission devices involve certain losses to friction, and thus heat, and the design resulting in greatest efficiency is usually applied to the so-called "top" transmission ratio, that is the ratio in which the output shaft rotates fastest for a given speed of rotation of the input shaft. In conventional incremental ratio gearboxes the greatest efficiency is usually achieved when the output shaft is travelling at the same speed as the input shaft to provide a 1:1 or "straight through" transmission ratio. There are, however, circumstances where the transmission ratio at greatest efficiency may be less than 1:1 and, correspondingly situations where a ratio of greater than 1:1 may be desirable.

In a continuously variable rolling contact transmission device of the type defined above the input to the device may be applied via the radially inner races and the output from the device taken from the planets via planet followers or a planet carrier, with the outer race constituting the stationary component. The high gear ratio is then achieved with the two components of the radially outer race located at their position of maximum spacing whilst the parts of the inner race are located as close to one another as possible so that the planets are, effectively, "squeezed" to their greatest radial position. Of course, it will be appreciated that the roles of input and output shaft can be reversed and, in the design in question, the roles of the three components, namely radially inner races, planets assembly, which includes planet followers and planet carriers, and radially outer races are all interchangeable so that any one of them may be held stationary and the other two used either as the input or the output member. It has been found, however, that a configuration as defined above with the outer race stationary has particular advantages from a constructional point of view.

One of the disadvantages arising from this configuration, however, if the planet is a ball, is that in order to obtain the highest ratio possible the patches where rolling contact takes place between the planets and the races are close to their end-of-range positions (closest to the axis of the ball in the case of the radially inner race and furthest from the axis of the ball in the case of the radially outer race). At the end-of-range positions the rolling of the planets over one or the other of the races involves a significant amount of "spin" at the contact patch between the planet and the race, and this generates considerable heat.

SUMMARY OF THE INVENTION

The present invention is directed at a rolling contact continuously variable transmission device of the type described above in which the disadvantage of excess heat generation in high transmission ratios is mitigated and a more favourable ratio between the contact patch spin and the roll angular velocity achieved in high ratios.

This is achieved, according to the invention, by changing the shape of the planets from a generally spherical configuration to one involving a spheroidal shape (either a prolate spheroid or an oblate spheroid, which, in essence, allows the contact patch to maintain a more favourable contact angle upon positional variations.

The present invention also involves the direct connection of the planets to the planet carrier by means of a fixed linkage, rather than by way of planet followers which, in earlier arrangements, themselves transferred the forces exerted on the planets to the planet carrier and then to or from the input or output shaft.

According to one aspect of the present invention, therefore, a continuously variable transmission device of the type having planetary members in rolling contact with radially inner and outer races each comprising axially spaced relatively axially movable parts and control means for determining the axial separation of the parts of one of the two races is arranged such that the planets are connected for planetary motion to a planet carrier by a linkage allowing the radial position of the planets to vary in response to variation in the axial separation of the parts of the said one of the two races while maintaining the circumferential connection.

This linkage may be formed as a "trailing link" configuration in which the planet carrier is joined to the planets at an axial mid-point of the planet by providing this latter with a central channel into which the linkage can extend. Transmission of forces is thus symmetrically balanced and a number of other advantages are achieved as will be described in more detail below.

The transmission device of the invention may be put into practice with planets in the form of composite bodies comprising two roller elements each having an outer surface of revolution for engagement with respective parts of the two races. The surface of revolution may be defined by a generatrix which is rectilinear, or has rectilinear, convex or concave portions. Naturally the shape of the races has to correspond to (but not match) that of the planets, being convex towards the planets in the case of rectilinear or concave planetary surfaces and concave in the case of convex planetary surfaces, which latter may be considered the most convenient arrangement.

As discussed above, the planets may be provided with an equatorial channel into which the linkage extends, and in a composite planet member the two individual roller elements of which it may be composed can be joined by an intermediate element to which the said linkage is connected.

The intermediate elements of each planetary body may be joined to the said linkages by roller bearings, preferably needle roller bearings which lie partially within the roller elements. For this purpose each roller element may be shaped as a half-shell. The linkage between each planetary body and the planet carrier may be in the form of a respective trailing arm for each planet. The term "trailing" is of course relevant in only one direction of relative rotation. In the other direction of relative rotation the "trailing" arm becomes a "leading" arm. Forces can be transmitted to and from the planets satisfactorily through such configuration because the planets at the ends of the arms and the linkage to the planet carrier are all constrained to follow a circular motion.

In general the surface of revolution of each roller element of each planetary body is defined by a curvilinear generatrix. This need not be a part of a circle nor, indeed, does it have to be symmetrical or even a regular curve. In one embodiment of the invention the curvilinear generatrix of each roller element surface is, however, an arc of a circle, and preferably the centre of the arc of the circle defining the generatrix for the surface of each roller element is offset axially and/or radially from the midpoint of the planet. If a spherical planet is taken as a standard or exemplary shape, the preferred shape of the planets for use in the present invention is achieved by effectively displacing the elementary surfaces radially inwardly towards the centre to form a pseudo-spherical body. This is achieved in two ways. If, starting with a notional sphere, an equatorial "slice" were taken through the entire sphere and the two remaining parts were brought together it would have an effect similar to the formation of an oblate spheroid. Similarly, if a cylindrical portion around the axis of rotation of the planetary element extending from one polar region to the other were removed and the remainder of the body effectively compressed in (maintaining the same shape) to replace the material removed, the effect would be to make the surface of the planetary body tend towards a more prolate spheroid. The net result is that the surfaces of the rolling element engaged by the races comprise those parts of a sphere towards the "central" or mid-range of the potential surface of the notional starting sphere, the parts close to the rolling axis and the equatorial region being removed or omitted. This results in a body in which the surface curvature is larger in the rolling direction than in the direction transverse to it. This description of the treatment of a notional sphere, however, is not intended to explain the operations involved in producing a planetary element, but rather only to describe its resultant shape. Being a composite element each of the two axial halves of the rolling element, which are identical to one another, may be manufactured as a "shell" to be held together with their open ends facing one another by an intermediate member as discussed above. In effect, if the surfaces are generated by generatrices which are in the form of the arc of a circle, the centre of the arc of the circle defining the generatrix for the surface of each roller element is effectively offset axially and/or radially from the midpoint of the planet.

In a preferred embodiment of the invention the planet carrier has a plurality of arms extending from one axial end of the device substantially parallel to the rotation axis of the device, and the free ends of the said arms are reinforced by a reinforcing ring linking together all the said free ends. This reinforcing ring occupies the space between the ends of the arms of the planet carrier and an end cover of the device, lying radially outwardly of the inner races so as not to interfere with the movement thereof.

The said radially inner and outer races are located within a fixed housing and one or other of the said races is rotatable with respect to the housing by the input or output member of the transmission device. In a preferred embodiment of the invention the radially inner race is turnable with respect to the housing with the input member of the transmission. Likewise, it is preferred that the planet carrier is turnable with respect to the housing with the output member of the transmission.

In such a configuration it is possible for the input and output members, which may be, for example, shafts, both to project from the same side of the housing, by forming the output shaft as a hollow member co-axially around the input shaft. This is particularly suitable for use as a transmission for two-wheeled vehicles in which the drive transmission to the driving wheel is effected by means of a chain drive.

In order to ensure lubrication and cooling of the transmission device of the invention various passages are provided for the introduction of a lubricant which also acts as a coolant as it is pumped through the device. For this purpose one end of the input shaft, preferably that opposite the end projecting from the housing, has a passageway for the introduction of the lubricant axially. This lubricant passageway preferably has a portion extending radially through the input shaft to the region occupied by the said radially inner race parts, and more preferably a median region between the two movable race parts.

In order to achieve relative axial displacement of the two race parts, these may be interconnected by means of a helical coupling, and the frictional inter-engagement can be reduced by the use of rolling elements between the two parts. One of the difficulties encountered with the use of such rolling elements in a helical coupling is the potential for creep of the rolling elements towards one end or the other of the range of movement. If this occurs the rolling element at the end of the track engages a stop preventing it from moving further and increasing frictional contact and reducing the effectiveness of the rolling elements by forcing them to rotate without rolling when engaged against the ends. In order to avoid this difficulty the present invention provides a configuration in which there are provided positive inter-engagement means at each end of the row of rolling elements whereby to prevent relative slip (or creep) between the rolling elements and the race parts in use of the device. Such positive inter-engagement means may, for example, comprise co-operating sets of teeth on the rolling element at one (or each) end of the row thereof and the race parts contacted thereby. This end element can, therefore, only roll upon displacement, with the engagement of the teeth preventing any form of slip.

Alternatively, the rolling elements themselves may have a special conformation. Rather than a spherical or cylindrical element, the rolling element may have a helical surface conformation for engagement with corresponding helical surface formations on the two race parts between which they are located. In effect, the two race parts have co-operating screw threads and the rolling elements, each of which may extend axially for the entire contact distance, has a corresponding screw thread which engages in threads of both the two relatively movable race parts. Any tendency for the rolling element to displace axially as it rolls along the screw thread of one component is countered by the corresponding tendency for it to move axially in the opposite direction by virtue of the rolling displacement along its own screw thread.

One of the limitations on many forms of continuously variable transmission is the inability of the device to transmit torque in both directional senses (to be distinguished from drive transmission in the two directions), in other words, although accelerating drive can be transmitted, decelerating drive, namely when the load drives the driven or output member faster than the drive or input member is driven by the motor cannot. This is familiar to motorists as the engine over-run condition, which allows engine braking of the vehicle. Transmissions which allow only unidirectional torque transmission cannot provide such an over-run facility which, however, is essential for motor transport applications. The transmission of the present invention can provide bi-directional torque transmission. By arranging for the parts of the said other race to be engaged to their associated drive member (whether it be input or output) by a screw coupling of the same hand the two race parts are then urged in the same direction by any torque transmitted through the device, one way or the other, regardless of the direction of rotation of the drive and driven members. By providing a limit stop at each end of the assembly to limit the movement of the "leading" race part, (and in this context it will be appreciated that for each direction of movement of the race parts with respect to the associated drive or driven members, there will always be a leading and a trailing member, these roles being reversed with a reversal in the direction of relative movement,) then whatever the instantaneous transmission ratio, the two parts of the said other race move together from one end to the other of their associated drive or driven member when a change in torque direction occurs, and the screw coupling maintains the force exerted between them which urges them together. The region of the drive or driven member adjacent the end stops experiences much greater stress (both in torque and in tension) than the rest of the member, because the end stops react only axial forces. In order to provide a large ratio range the radial dimension of the drive or driven member must be kept small. However, larger sections are required to support the greater loads imposed on the system for higher power applications (such as for motor vehicle transmission). For this reason, embodiments of the invention are envisaged in which the end stops are formed with means for reacting torque as well as axial forces. This may be achieved, for example, by forming the end stops as dog clutch stops. A 90° dog tooth, which reacts torque but not axial force, would work in theory, but the tooth bearing area would be very small because the mating dog on the race has to approach at a shallow angle as determined by the ball screw helix. The optimum solution lies somewhere between the 90° tooth angle of the classic dog tooth and the 0 degree "tooth" angle of the plain stop, and 25° is chosen here for best all-round performance in terms of bearing area, shaft stresses and ball screw loads.

The 25° contact angle dog drive may be viewed as a second helical engagement mechanism in parallel with the first (the ball screw) but of opposite hand, such that the loads are advantageously shared between the two.

In one embodiment of the invention the said dog clutch arrangement has axially extending teeth with inclined crests the angle of inclination of which is determined by the pitch angle of the flights of the screw thread interengagement between the said two race parts and the said drive transmission member. The present invention may be put into practice with an arrangement in which the said dog clutch arrangement comprises an annular array of axially extending pins or studs on each said part of the said other race and on the said drive transmission member. Preferably the end stop means are carried on respective collars fitted to the said drive transmission means.

The axial oil flow passage within the central shaft of the transmission may also have radial outflow openings to the region at one end of the relatively movable radially inner races to direct coolant lubrication to this region.

Preferably there are provided oil ways through the collars for the passage of lubricating oil, having unidirectional valves opening into an enclosed oil-containing volume defined in part by the respective part of the said other race whereby to provide damping of the motion of the said part of the said other race as it approaches the end stop of the drive transmission member. In a device configured such that the drive transmission member is a central input drive shaft of the device and the said other race is the radially inner race, the two parts of the said radially inner race act as the cylinders of the damper, with the collars acting as the respective pistons thereof.

The present invention also comprehends a transmission device of the type having planetary members in rolling contact with radially inner and outer races each comprising two axially spaced parts, with control means for selectively varying the axial separation of the two parts of one race and thus the radial position of the planetary members in rolling contact therewith, in which the contact surfaces of the planets are separated into two regions by a median channel in which is engaged a link connecting the planets to a planet carrier.

The present invention also comprehends a transmission device of the general type defined above in which the planets are separated into two parts by a peripheral circumferential groove and the contact surfaces are the surfaces of a body of revolution the generatrices of which are curvilinear lines to form a prolate or oblate spheroid.

BRIEF DESCRIPTION OF THE DRAWINGS

Various embodiments of the present invention will now be more particularly described, by way of example, with reference to the accompanying drawings, in which.

DETAILED DESCRIPTION OF THE PREFERRED EMBODIMENTS

Figure 3:
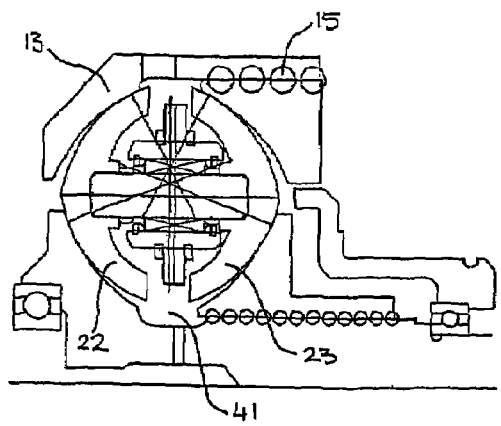
FIG. 3 is an axial sectional view of a part of the embodiment of FIG. 1, illustrating the components in a high transmission ratio.
Figure 1:
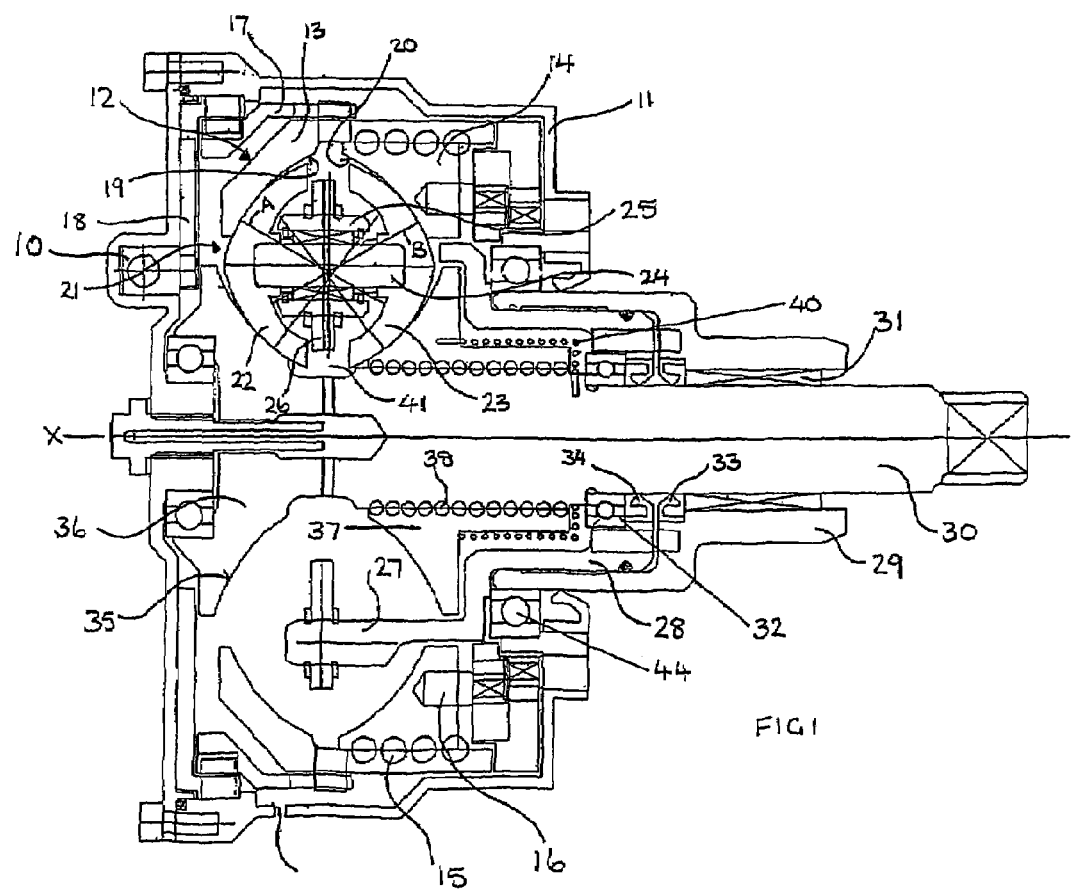
FIG. 1 is an axial sectional view taken on the line I—I of FIG. 2, of a rolling contact continuously variable transmission device formed as an embodiment of the present invention shown in a low transmission ratio.
Figure 2:
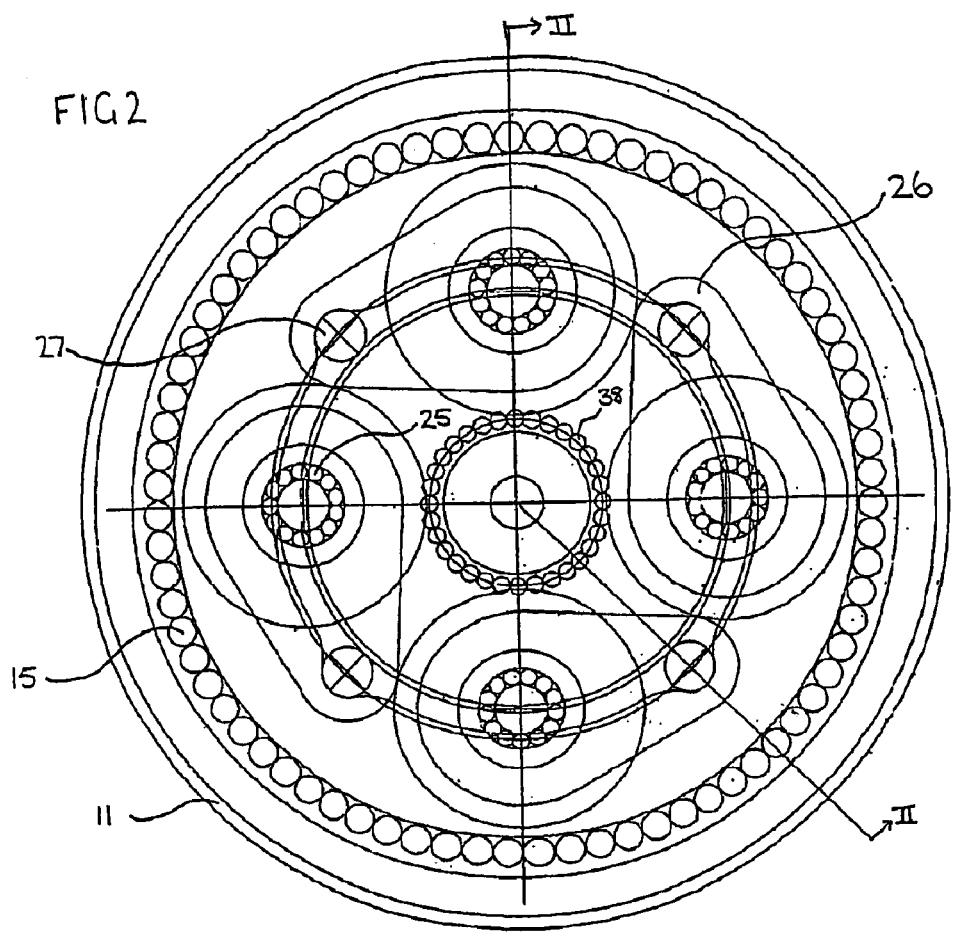
FIG. 2 is an end view of the embodiment of FIG. 1.

Referring now to the drawings, and particularly to FIGS. 1, 2 and 3, the transmission device shown comprises a housing generally indicated 11 within which is located a radially outer race 12 formed in two relatively axially displaceable parts 13, 14 engaged together by a so-called "ball screw" comprising several helical rows of balls 15 engaged in corresponding helical grooves in the two parts 13, 14 allowing them to turn with respect to one another about the central longitudinal axis X-X of the device. The ball screw has several starts (four in this case); this results from the need to fill the space available with balls (for maximum load capacity) but to avoid using large balls (which would be required for a single start thread) with the relatively long lead needed to balance the axial and circumferential loads. Relative axial displacement between the two parts 13, 14 is achieved by mounting the part 14 on fixed pins 16 which form an Oldham coupling with a pair of pins in the housing to restrain the race part 14 against rotational motion whilst allowing axial displacement. The Oldham coupling is used here as a "tolerance accommodating" arrangement which allows radial translation but not rotation. The two pairs of pins do not in fact lie in the same plane, as appears to be shown in the drawing, but are disposed at 90° from each other and the small flats indicated by the crosses run in slots in the Oldham ring. The rotationally displaceable race part 13 is held in a generally cylindrical holder 17 which can be turned about the axis X-X by an adjuster arm 18 turned by an adjuster actuator 10. The actuator 10, seen end-on in FIG. 1 is preferably a screw actuator having a ball screw driven by an electric motor (not shown). By turning the rotationally displaceable race part 13 about the axis X—X this is itself effectively "screwed" in relation to the axially displaceable outer race part 14 by the action of the ball screw 15, causing this to move axially along the slide pins 16 without turning. In this way the two race parts 13, 14 are moved apart or together by turning the rotationally displaceable outer race part 13 in one direction or the other. The two race parts have curved race surfaces 19, 20 engaged by the curved surfaces of a planetary member generally indicated 21 which comprises two approximately hemispherical shells 22, 23 held together by a central pin 24 which carries a rolling element bearing 25 by which the planet member 21 is carried on a respective connecting link 26. As can be seen in FIG. 2 each connecting link 26 is connected to a planet carrier arm 27 of a planet carrier 28 which is fixedly connected to an output shaft 29 which co-axially surrounds and is borne on the input shaft 30 by means of a bearing 31. A further bearing 32 interconnects the input shaft 30 and the planet carrier 28, and seals 33, 34 protect the interior of the device from ingress of dust, dirt and other contaminating particles, humidity or moisture.

The planet members 21 also roll on an inner race generally indicated 35 comprising an axially fixed race part 36 and an axially displaceable race part 37 carried thereon by a ball screw 38 similar to that by which the two parts of the radially outer race are interconnected. A light pre-loading torsion spring 40 urges the axially displaceable inner race part 37 towards the planet member 21 in order to maintain contact.

The manner in which transmission ratios are changed and the torque between the input and output shaft is sensed by the axially displaceable radially inner race part 37 carried by the ball screw 38 on the axially fixed race part 36 is described in our above-mentioned International Patent Application No. WO99/35417, the disclosure of which is incorporated herein by reference and will not be further described here except in relation to the shape of the planet members 21.

In the earlier International Application referred to above the planets were spherical solid balls and the forces exerted by their motion between the radially inner and outer races were transmitted via planet followers located between each adjacent pair of planets. When the outer race parts are moved together in order to urge the planets radially inwardly the radially inner race parts were forced apart with the contact pressure being maintained by the torque-sensitive configuration as explained in that document. As the two radially outer race parts approach their position of closest approach the contact patches between the planets and the races move radially inwardly and, by virtue of the shape of the spherical planets, the normal to the contacting surfaces, which passes through the centre of the planet, becomes more shallowly inclined with respect to the rolling axis so that the radially resolved component of force becomes smaller and the axially resolved component greater. A very much larger absolute contact force on the planet must, therefore, be exerted in order to reach the lower ratios and, of course, there comes a point at which the additional radial displacement available by further increasing the force becomes relatively small and the forces become unacceptably high. Moreover, in the highest and lowest ratio the contact patches closest to the rolling axis of the planet experience substantial "spin" increasing the heating effect of the frictional contact thereby generating additional heat which needs to be dissipated in order to maintain the device within tolerable limits. By contrast to the shape of a spherical planet, however, the configuration of the planet member 21 in the present invention exploits only those sectors of the circumferential generatrix which are most effective, with the equatorial band being omitted due to the presence of the annular space 41 between the two shells 22, 23 and the shape of the polar regions being modified by the shape of each of the shells 22, 23. In this embodiment, as can be seen from FIG. 1, in the lowest ratio achievable, where the outer race parts 13, 14 contact the planet member 21 closest to its rolling axis the contact surfaces are still inclined at an angle in the region of 30° and, moreover, the intersection of the normals to the contact surfaces, represented by the lines A and B in FIG. 1 intersect at a point offset from the centre of the spheroid defined by the curved running surfaces of the planet member. This limits the spin of the contact patches and enables the device to bear greater loads. The direct connection of the planet members 21 via links 26 to the planet carrier arms 27 also enables the device to sustain a greater load by allowing more planets to be fitted into the available space.

Figure 5:
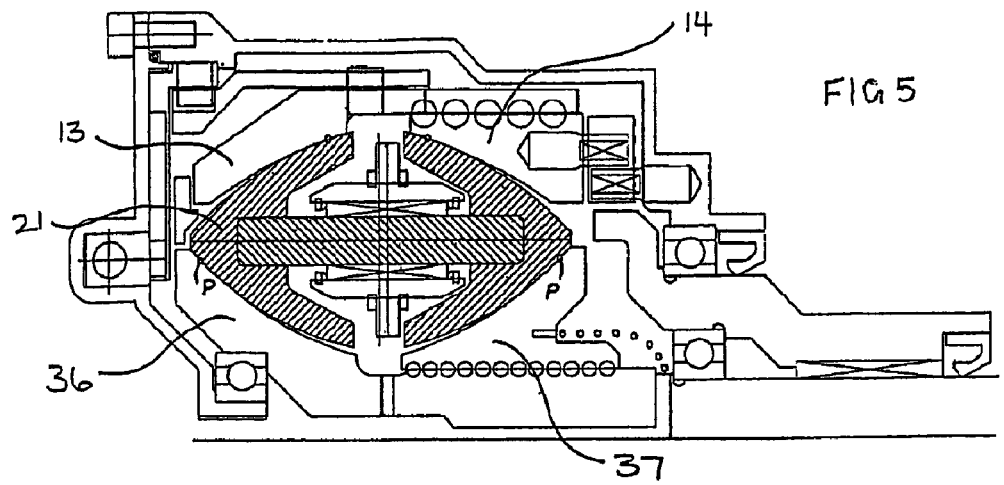
FIG. 5 is a similar axial view of part of the embodiment of FIG. 4 showing the movable components in a configuration for a high transmission ratio.
Figure 4:
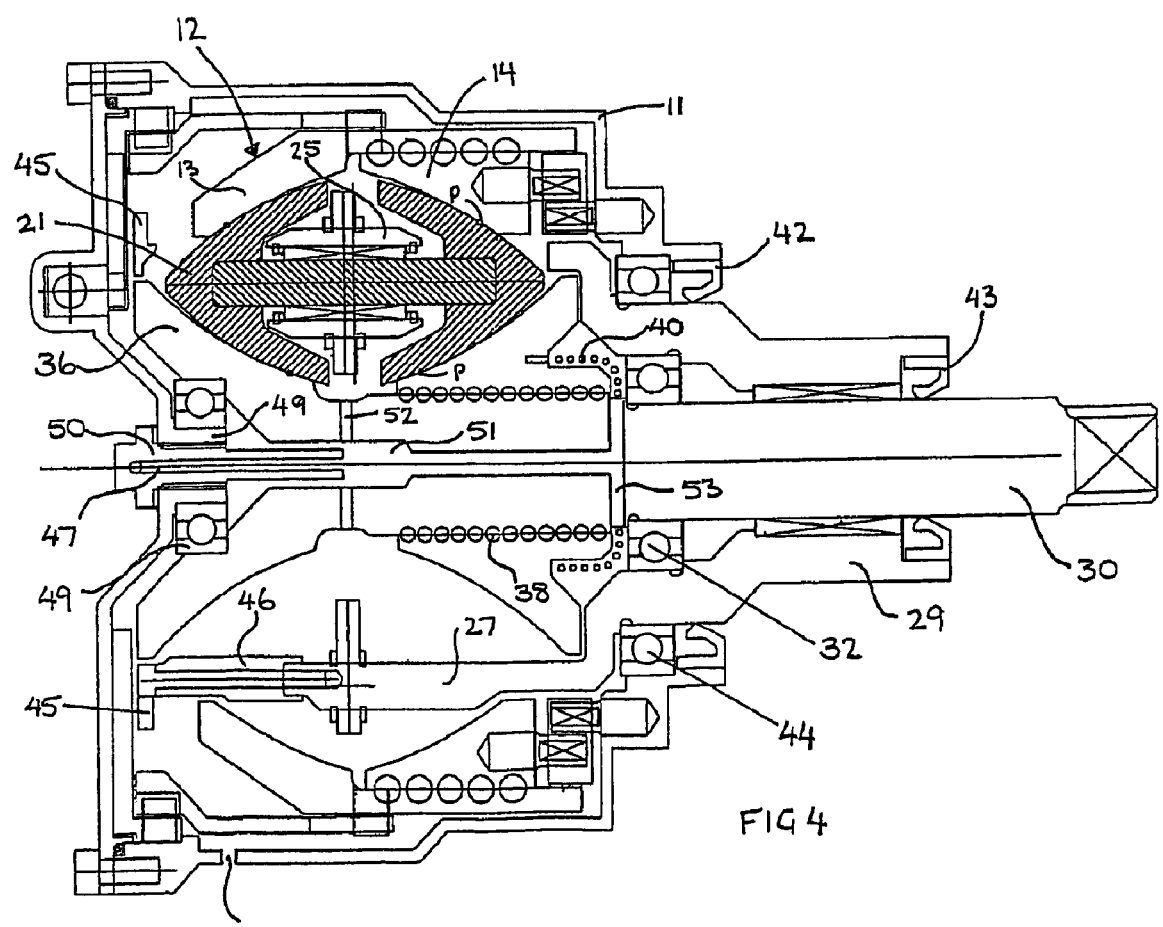
FIG. 4 is an axial sectional view similar to that of FIG. 1, illustrating a second embodiment of the invention in which the planetary members are prolate spheroids shown in a configuration for a low transmission ratio.

Referring now to FIGS. 4 and 5 there is shown an alternative embodiment in which the planetary members have a more pronounced prolate shape. In the embodiment of FIGS. 4 and 5 those components which correspond to or fulfil the same function as corresponding components in the embodiments of FIGS. 1 to 3 have been identified with the same reference numerals. In this embodiment, however, the arms 27 of the planet carrier are formed integrally with the output shaft 29 so that the bearing 32 between the input shaft and the planet carrier now acts directly between the input and the output shaft, and the bearing 44 between the output shaft and the casing, previously axially offset from the bearing 32, is now in close axial alignment therewith, increasing the strength of the device. The seals 33, 34 are replaced by a seal 43 between the end of the output shaft and the input shaft 30, and a seal 42 protects the bearing 44 from the ingress of dust, dirt and other contaminants between the output shaft 29 and the casing 11.

The arms 27 of the planet carrier have extension pieces 46 secured thereto carrying a reinforcing ring 45 in a position immediately surrounding the end of the axially fixed inner race part 36. This inner race part 36 is borne by a bearing 48 on a boss 49 of the casing 11, within which is located a central plug 50 having an axially extending passage 47 for the introduction of the cooling lubricant into the interior of the device. The passage 47 in the plug 50 opens into a chamber 51 within the combined input shaft 50 and inner race 35 from which extend two radial passages 52, 53 the first being axially located in register with the space 41 between the shells 22, 23, allowing cooling lubricant to be injected directly into contact with the bearings 25 between the planet members 21 and the links 26, and the second (53) opening into the region of the main bearing 32 between the output shaft 29 and the input shaft 30. The chamber 51 also extends to the bearing 49 so that oil injected into the central passage 47 in the shaft 30 can be directly applied to the main bearings 49, 32, the radially inner ball screw 40 and the bearings 25 of the planet members 21. The additional cooling and lubrication insured by this force flow of lubricant, together with the presence of the reinforcing ring 45 and the prolate shape of the planet members 21 enables a higher load-bearing capacity to be achieved.

As can be seen in FIG. 4 the highly prolate spheroid shape of the planet members 21 ensures that the normal to the contact patches, illustrated by the dots P in FIG. 4, remain inclined at more than 45° to the rolling axis of the planet member 21 even upon closest approach to this axis. The resolution of forces into radial and axial components can then be seen to favour the radial component even when the two parts 13, 14 of the radially outer race 12 are in their position of closest approach (FIG. 4) without detrimentally affecting the axial component of the forces exchanged between the planet members 21 and the parts 36, 37 of the radially inner race 35. Likewise, as can be seen in FIG. 5, where the radially outer race parts 13, 14 are shown in their position of greatest separation, the angles between the normals to the contact patches P between the planet member 21 and the radially inner race parts 36, 37 remains inclined in the region of 45° to the rolling axis of the planet thereby favourably increasing the radial component of this force in comparison with the radial component of the corresponding force in a spherical planet.

It will be appreciated that arrangements to allow bi-directional torque transmission through a device such as the transmission device described above can be introduced using the ideas explained in co-pending application number 0016261.0 the disclosure of which is incorporated herein by reference.

One of the problems associated with ball screws such as the screws 15, 38 used to interconnect the two parts of the radially inner and radially outer races 12, 35 lies in the fact that slip or "creep" between the balls and the raceways in which they are housed can result in the balls at the ends of the row engaging end stops and being prevented from executing their normal rolling motion. This can be countered by providing the balls at each opposite end of the row with teeth meshing in corresponding teeth or serrations at the end regions of the helical channels. This does not compromise the load bearing capability of the remainder of the ball screw whilst allowing certainty in the rolling action ensuring that no slip between the balls and the channels takes place.

Figure 6:
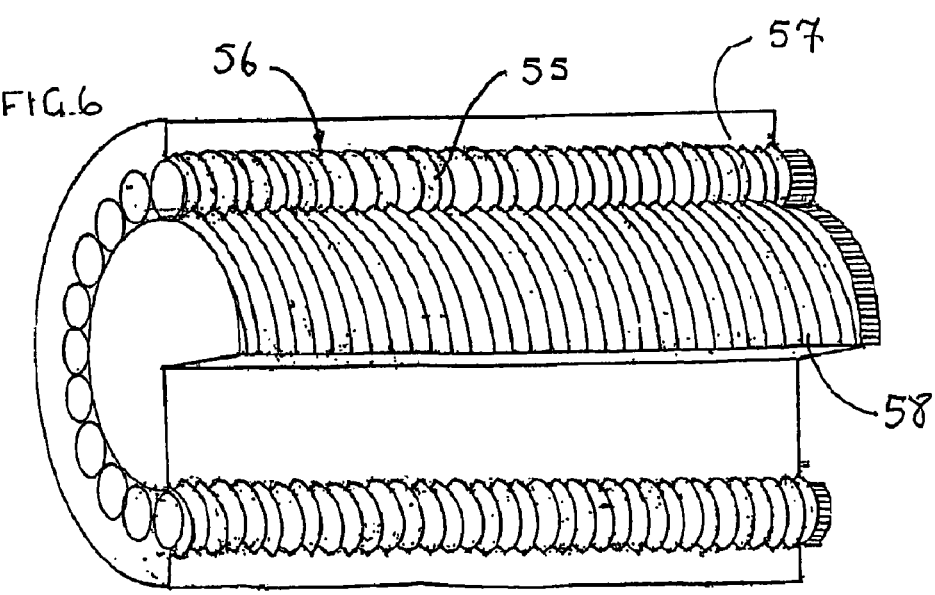
FIG. 6 is a schematic view of a part of a further embodiment of the invention showing a modified helical interengagement arrangement.

In the alternative configuration illustrated in FIG. 6 the balls may be replaced by rollers 55 having helical grooves 56 which engage in corresponding helical grooves 57, 58 in the radially outer and radially inner components between which the rollers 55 are located. Naturally the pitch and number of threads in each component is the same and preferably the rollers have a single start thread which may preferably be a triangular thread with an included angle of 90° although the thread form may be barrelled in order to ensure a large contact radius. Because the threads all have the same pitch the rollers are not shifted axially as they roll between the two members, any tendency to move axially in one direction by the thread on one of the members being countered by the tendency to move axially in the opposite direction by the thread upon the roller. At each end the rollers have gear teeth which mesh with toothed rings on the two members between which the rollers are engaged in order to ensure correct rolling motion without any slip.

Figure 8:
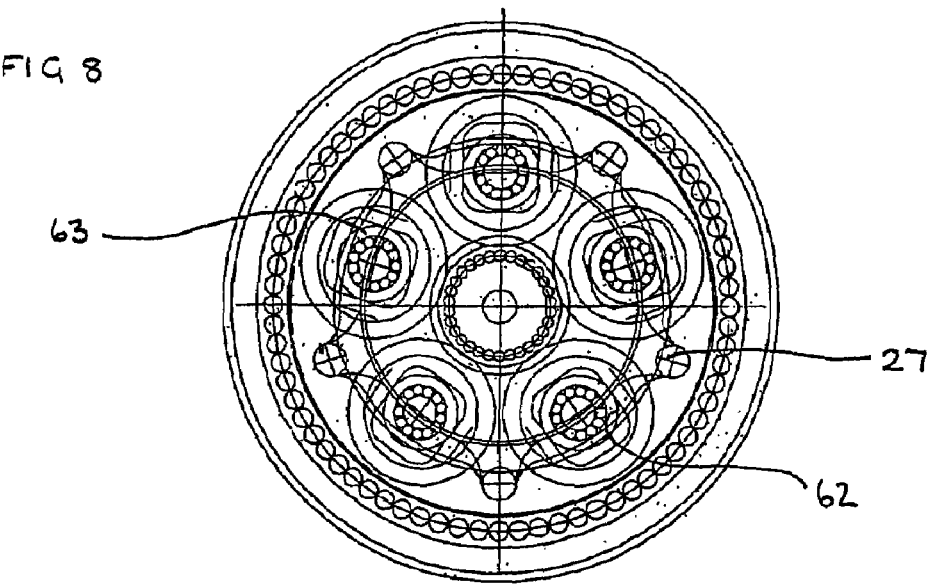
FIG. 8 is an end view of the embodiment of FIG. 7.
Figure 7:
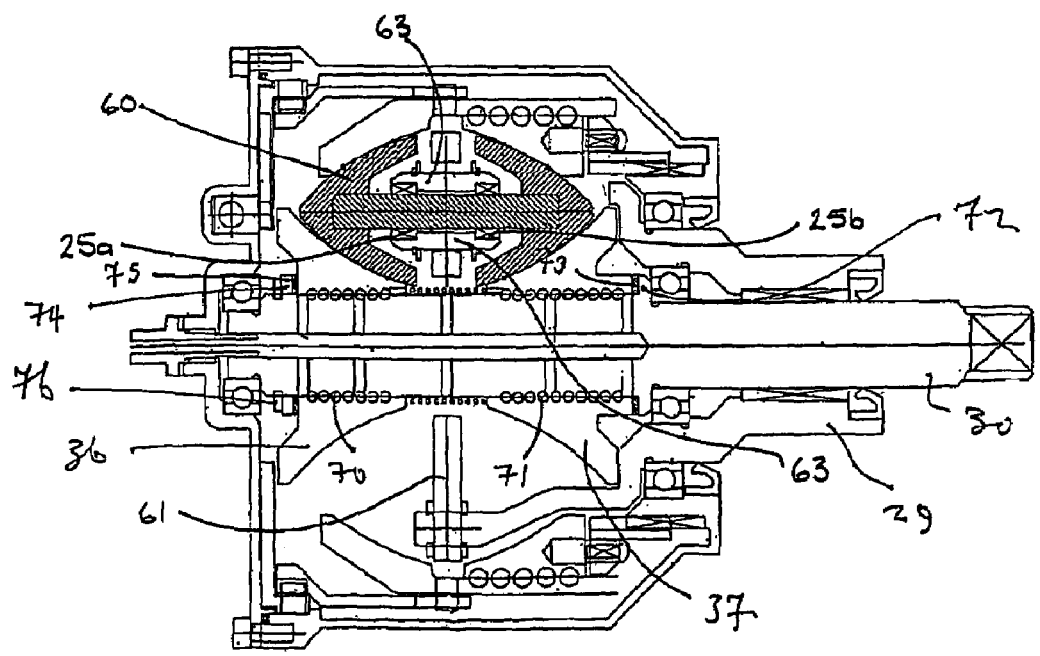
FIG. 7 is an axial sectional view of a further embodiment of invention.

Referring now to FIGS. 7 and 8, the alternative embodiment shown is configured to allow maximum use to be made of the circumferential space so that the greatest possible number of planets can be fitted in a device of a given size. In FIGS. 7 and 8, as in the previous embodiments, the same reference numerals are used to indicate the same or corresponding components. As will be seen from FIG. 8 this embodiment has five planets 60 in a transmission of the same dimensions as the embodiment of FIG. 1 which has only four planets. These planets 60 are linked to the arms 27 of the carrier by a disc 61 fixed to the arms 27 of the planet carrier in the median plane of the ring of planets 60. The disc 61 has wide generally radial slots 62 within which are housed bushes 63 which house rolling element bearings 25a, 25b on which the planets roll. The bushes 63 themselves roll within the slots 62 during ratio changing movements. The slots could be inclined from the strictly radial orientation, and this allows the contact forces at the inner race to be increased or reduced while those at the outer race are reduced or increased respectively. This can be a useful design tool.

This embodiment is circumferentially very compact and has a high load-bearing capacity. The disc 61 is thickened locally to provide wider support for the rollers constituted by the bushes 63 and, of course, it is not necessary to extend the arms 27 of the planet carrier to a reinforcing disc as in the embodiment of FIG. 4 since the disc 61 itself provides a much greater stiffness. This embodiment also allows bi-directional torque transmission between the input shaft 30 and the output shaft 29. For this purpose the ball screw 38 of, for example, FIG. 1, between the input shaft 30 and the right hand inner race half 37 is replaced by a coaxial ball screw coupling 70, 71, in the form of respective rows of balls in co-operating thread flights in the input shaft 30 and both the left and right inner race halves 36, 37. Both ball screws are the same hand so that a given direction of torque transmission will cause both inner race halves to tend to be driven axially along the input shaft 30 in the same direction, for example to the left for positive drive torque transmission and to the right for over run or negative drive torque transmission.

The drive shaft 30 has a central flange 72 forming a shoulder with an annular wear pad 73, and the left hand end of the drive shaft 30 carries an annular abutment end stop 74 with a corresponding annular wear pad 75. The member 74 is retained in position by a circlip 76 engaged in an annular groove in the end of the drive shaft 30.

The two end stops 72, 74 engage corresponding radial surfaces of the right and left inner race halves 37, 36, respectively. Thus, during positive drive transmission when the two race halves 36, 37 are both driven to the right as viewed in the drawing, the abutment 72 limits the movement of the race half 37 so that the continued screwing action on the race half 36 maintains the squeezing force on the planets 60. Correspondingly, for negative torque transmission, the two race halves 36, 37 travel to the left on their respective ball screws 70,71 until the race half 36 engages the end stop 74 and the continued screwing action of the ball screw 70 drives the race half 37 towards the race half 36, again maintaining the squeezing action on the planets 60. Depending on the precise transmission ratio in force at the time of torque reversal there may be a more or less significant shift in the position of the race halves 36, 37. That is, in a low ratio, when the race halves 36, 37 are at their maximum separation, there may even be no (or at least very limited) displacement along the ball screws 70,71. On the other hand, in the highest ratio when the radially inner race halves 36, 37 are at their position of closest approach there is the maximum separation between their opposite radial faces and the end stops 72, 74 so that a maximum axial displacement takes place. This can lead to a noticeable impact of the race half against the corresponding end stop upon torque direction change, and the embodiment of FIG. 9 is provided with means for overcoming any disadvantages associated with this.

Figure 9:
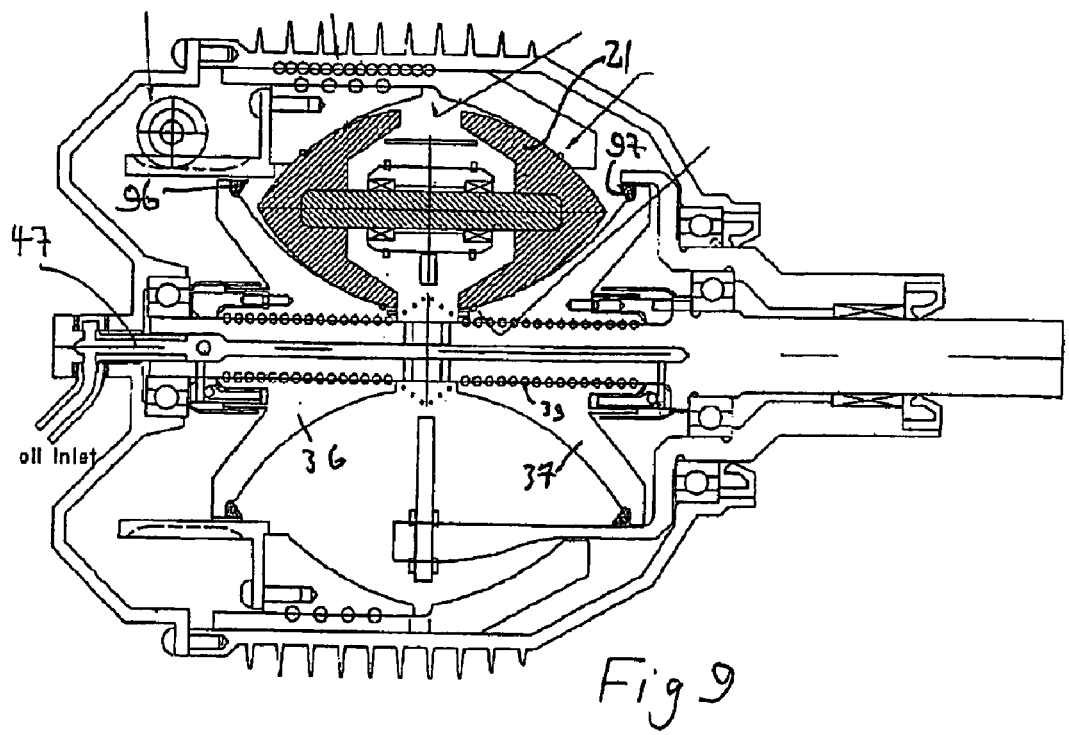
FIG. 9 is an axial sectional view of a further embodiment of the invention designed both for heavy loads and a large ratio range.
Figure 10:
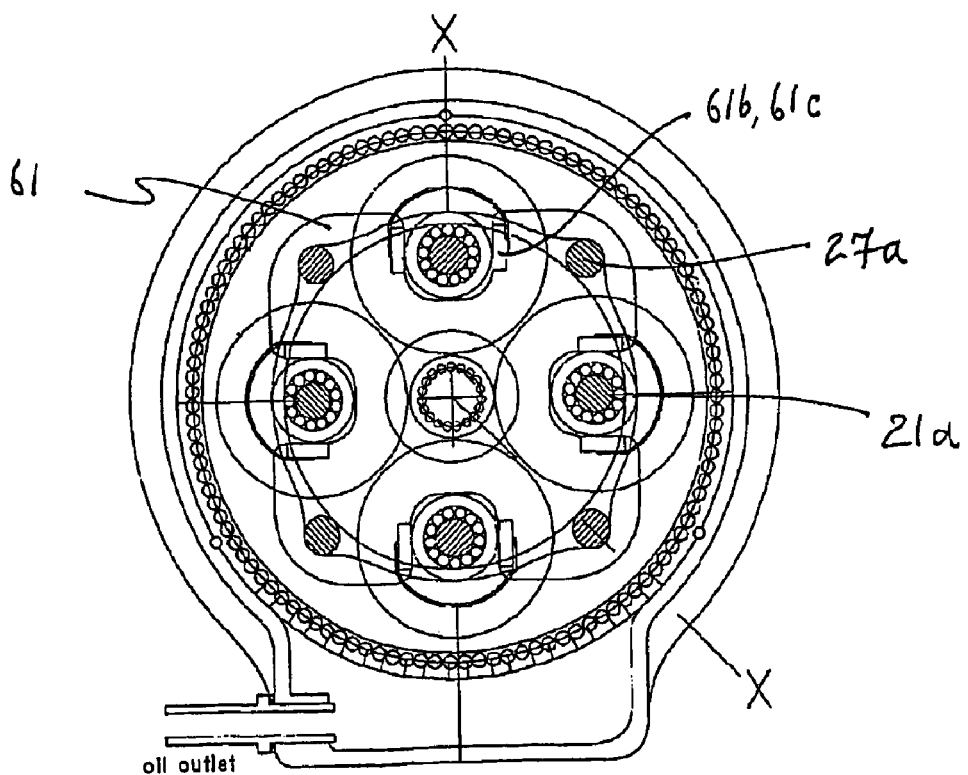
FIG. 10 is an end view of the embodiment of FIG. 9.
Figure 12:
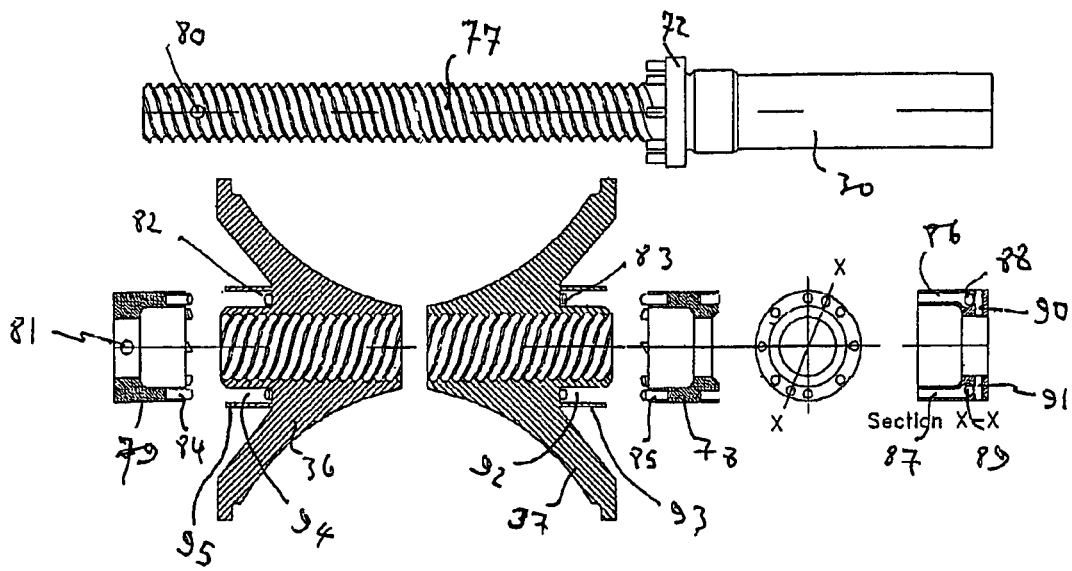
FIG. 12 is an exploded sectional view of the inner race component set of the embodiment of FIGS. 9 and 10.

The embodiment of FIG. 9 is also configured, as mentioned above, for supporting a heavier load and obtaining a large ratio range as will be explained in more detail below. Again, as with the earlier embodiments, those components which are the same as or fulfil corresponding functions to the embodiments described earlier will be identified with the same reference numerals. In this embodiment the inner race component set, particularly illustrated in FIG. 12, comprise the two inner race halves 36, 37 mounted by a ball screw configuration on a threaded part 77 of the input shaft 30 by balls 39 (see FIG. 9) which are not shown in FIG. 12. In place of the end stops 72, 74 the embodiment of FIG. 9 has two collars 78, 79 the former of which is engaged on the flange 72 of the drive shaft 30 and the latter of which is secured to the opposite end of the drive shaft 30 by means of a shear pin (not shown) passing through aligned holes 80 (in the shaft 30) and 81 (in the collar 79).

In order to permit a large ratio range it is necessary for the ballscrew section of the shaft 30 to have as small a diameter as possible. For heavier loads, however, the shaft requires to be more robust. In order to share the load a dog-clutch arrangement between the inner race halves 36, 37 and the collars 79, 78 is provided. This comprises an annular array of axially extending pins 82, 83 on the race halves 36, 37 and an annular array of pins 84, 85 on the collars 79, 78. The end faces of these pins are inclined to allow them at least partially to react both torsional and axial loads, bearing in mind that the engagement of the dog clutch thus formed occurs with a relatively helical motion of the raceway parts 36, 37 on the screw threaded part 77 of the shaft 30.

For damping the backlash which occurs upon torque reversal as discussed in relation to FIG. 7, the embodiment of FIGS. 9 to 12 is provided with a pair of axial passageways 86, 87 controlled by respective unidirectional valves 88, 89 which allows oil in the central channel 47 to pass radially, via respective radial passages 90, 91, through the unidirectional valves 88,89 into the axial passages 86, 87 and from there into an annular chamber 92 defined between the race way half 37 and the collar 78 by an annular tubular sleeve 93. The left hand raceway half 36 has a similar annular chamber 94 defined by sleeve 95 for oil entering through passages (not shown) in the collar 79. Oil under pressure in these chambers 92, 94 can only escape through the small gap between the collar acting as the (annular) piston and the cylinder defined by the race way half as the race is driven towards the stop on torque reversal. This damps the backlash and prevents impact noise as metal-to-metal drive is re-established.

Figure 11:
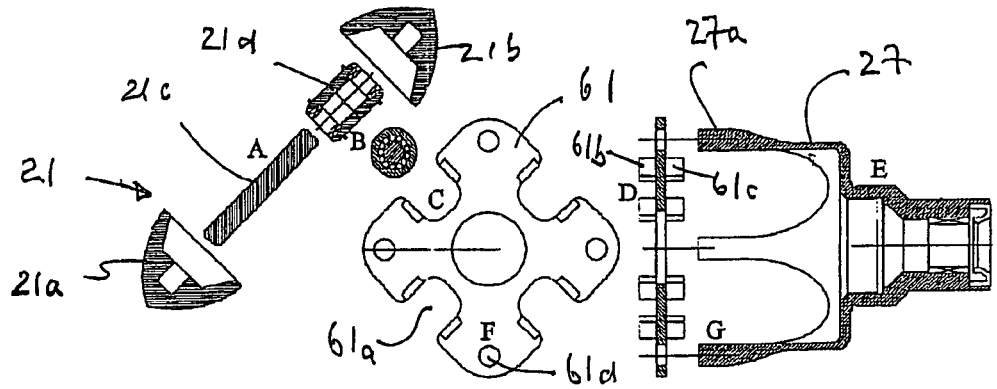
FIG. 11 is an exploded view of the power take-off components of the embodiment of FIGS. 9 and 10.

A typical planet 21 is illustrated as part of the power take-off system shown in FIG. 11, and comprises 2 planet halves 21a, 21b which are a push fit on a central shaft 21c which is first passed through the sleeve 21d having appropriate cylindrical needle bearings at each end. The sleeve 21d engages in a radial slot 61a in the plate 61 (in this embodiment an approximately square plate with rounded corners) which slot has axially extended sides 61b, 61c to provide a widened surface on which the sleeve is able to roll a small distance in a radial direction. The plate 61 delivers its power to the carrier 27 via holes 61d into which fingers 27a of the carrier engage.

In all of the embodiments described above it is possible to arrange for a top gear transmission ratio in which the contact patch spin is avoided by limiting the maximum possible radially outward excursions of the planets to be less than that allowed by the radially outer race when the two parts thereof are separated beyond a threshold value.

This can be achieved in the embodiments of FIGS. 1 to 6 by limiting the rotation of the links 26, for example by means of an abutment stop (not shown) mounted on the carrier to arrest outward excursion of the link 26. This could be positioned at some point between the end connected to the planet and the end connected to the planet carrier. In the embodiment of FIGS. 7 and 8 this objective could be achieved by ensuring that the radially outer ends of slots 62 hold the planets to a radially outward excursion less than that allowed by the maximum separation of the parts of the radially outer race. In the embodiment of FIGS. 9 to 12, this top gear lock up is provided by forming the inner race halves 36, 37 with respective grip rings 96, 97 at their periphery, and shaping them such that the grip rings engage the planets 21 on the radially outer side of the rolling axis. Thus, when the radially outer races 13, 14 are separated to their maximum extend, allowing the radially inner races to reach their position of closest approach driven by the ball screw 39, the two grip rings 96, 97 engage the planets 21 to form a direct drive between the input shaft and the output shaft. In this configuration, which requires there to be clearance between the planet 21 and the outer races 13, 14, there is a, step change, typically in the region of 1.2:1, between the highest rolling ratio and this locked top gear since the planets 21 are held against rotation by the radially inner race halves in this condition.

The invention claimed is:

1. A continuously variable transmission device of the type having planetary members in rolling contact with radially inner and outer races each comprising axially spaced relatively axially movable parts, and control means for determining the axial separation of the parts of one of the two races, in which the planetary members are connected for planetary motion to a planet carrier by connection means which allows the radial position of the planetary members to vary in response to variation in the axial separation of the parts of the said one of the two races while maintaining the circumferential connection, which planetary members are compound bodies each comprising two roller elements, said two roller elements each having an outer surface of revolutions for engagement with respective parts of the two races, and being joined by an intermediate element which holds said two roller elements in a predetermined spaced relationship in which they are capable of rotating relative to each other, said connection means being associated with said intermediate element whereby to transmit forces between said roller elements and said planet carrier.

2. A continuously variable transmission device according to claim 1, in which said two intermediate elements of each planetary member are joined to the said connection means by rolling element bearings.

3. A continuously variable transmission device according to claim 1, in which the connection means between the planetary members and the planet carrier comprises a respective trailing arm for each planetary member.

4. A continuously variable transmission device according to claim 1, in which the connection means between the planetary members and the planet carrier comprises a connector plate having a plurality of slots, each slot having at least a radial component, within each of which a part of a respective planetary member is engaged.

5. A continuously variable transmission device according to claim 4, in which the slots of the connector plate engage respective bushes of the planetary members within which are located rolling element bearings on which the planetary members rotate.

6. A continuously variable transmission according to claim 1, in which the surface of revolution of each roller element of each planetary member is defined by a curvilinear generatrix.

7. A continuously variable transmission device according to claim 6, in which the curvilinear generatrix of each roller element is an arc of a circle.

8. A continuously variable transmission device according to claim 7, in which the centre of the arc of the circle defining the generatrix for the surface of each roller element is offset axially and/or radially from the mid point of the planetary member.

9. A continuously variable transmission device according to claim 1, in which the planet carrier has a plurality of linkage support arms extending substantially parallel to the axis of rotation of the device from one axial end of the device, and the free ends of the said linkage support arms, are reinforced by a reinforcing ring linking together all the said free ends.

10. A continuously variable transmission device according to claim 9, in which an output shaft extends coaxially around an input shaft and both project from the same side of a housing.

11. A continuously variable transmission device according to claim 10, in which one end of the input shaft opposite the end projecting from the housing has a passageway for the introduction of lubricant.

12. A continuously variable transmission device according to claim 11, in which the lubricant passageway has a portion extending radially through the input shaft to the region occupied by the said radially inner race parts.

13. A continuously variable transmission device according to claim 1, in which the said radially inner and outer races are located within a fixed housing and one of said races is rotatable with respect to the housing by an input or an output shaft of the transmission device.

14. A continuously variable transmission device according to claim 13, in which the radially inner race is turnable with respect to the housing with the input shaft of the transmission device.

15. A continuously variable transmission device according to claim 14, in which the planet carrier is turnable with respect to the housing with the output shaft of the transmission device.

16. A continuously variable transmission device according to claim 1, in which the planet carrier is formed in one piece with an output or an input shaft of the transmission device.

17. A continuously variable transmission device according to claim 1 in which the two parts of the radially outer race and/or the radially inner race are interconnected by means of a helical coupling, with rolling elements between the two parts to reduce friction.

18. A continuously variable transmission device according to claim 17, in which there are provided positive interengagement means at each end of the row of rolling elements whereby to prevent relative slip between the rolling elements and the race parts in use of the device.

19. A continuously variable transmission device according to claim 18, in which the positive interengagement means comprise co-operating sets of teeth on the rolling element at least at one end of the row thereof and the race parts contacted thereby.

20. A continuously variable transmission device according to claim 17, in which the rolling elements themselves have a helical surface conformation for engagement with corresponding helical surface formations on the two race parts between which they are located.

21. A continuously variable transmission device according to claim 1, in which the other of the two races is interengaged with an associated drive transmission member (input or output; driving or driven) by a screw coupling of the same hand as that of the said helical coupling, there being respective end stop means for limiting the travel of the associated race part of the said other of the two races in a respective directional sense whereby to permit torque transmission through the device in both senses.

22. A continuously variable transmission device according to claim 21, in which said end stop means includes means for torsionally interengaging the drive transmission member with said respective race part in the end-of-travel position thereof.

23. A continuously variable transmission device according to claim 21, in which the said means for torsionally interengaging said drive transmission member comprises a dog clutch arrangement.

24. A continuously variable transmission device according to claim 23, in which said dog clutch arrangement has axially extending teeth with inclined crests the angle of inclination of which is determined by reference to the pitch angle of the flights of the screw thread interengagement between the said two race parts and the said drive transmission member.

25. A continuously variable transmission device according to claim 23, in which said dog clutch arrangement comprises an annular array of axially extending pins or studs on each said part of the said other race and on the said drive transmission member.

26. A continuously variable transmission device according to claim 21, in which said end stop means are carried on respective collars fitted to the said drive transmission means.

27. A continuously variable transmission device according to claim 26, in which there are provided oil ways through the collars for the passage of lubricating oil, having unidirectional valves opening into an enclosed oil-containing volume defined in part by the respective part of the said other race whereby to provide damping of the motion of the said part of the said other race as it approaches the end stop of said drive transmission member.

28. A continuously variable transmission device according to claim 27 in which said drive transmission member is a central input drive shaft of the device and the said other race is the radially inner race, the two parts of the said radially inner race acting as the cylinder of the damper, with the collars acting as the respective pistons thereof.

29. A continuously variable transmission device according to claim 1, in which said rolling element bearings are needle roller bearings.

30. A continuously variable transmission device of the type having planetary members in rolling contact with radially inner and outer races each comprising axially spaced relatively axially movable parts, and control means for determining the axial separation of the parts of one of the two races, in which the planetary members are connected for planetary motion to a planet carrier by connection means which allows the radial position of the planetary members to vary in response to variation in the axial separation of the parts of said one of the two races while maintaining the circumferential connection, which planetary members are compound bodies each comprising two roller elements, said two roller elements each having an outer surface of revolution, for engagement with respective parts of said two races, and being joined by an intermediate element which holds said two roller elements in a predetermined spaced relationship, said connection means being associated with said intermediate element whereby to transmit forces between said two roller elements and said planet carrier, said planetary members being of prolate spheroid shape such that a normal at a point of contact of each planetary member to its radially inner and outer races is in the region of not less than 45° to the axis of rotation of said planetary member.

31. A continuously variable transmission device of the type having planetary members in rolling contact with radially inner and outer races each comprising axially spaced relatively axially movable parts, and control means for determining the axial separation of the parts of one of the two races, in which the planetary members are connected for planetary motion to a planet carrier by connection means which allows the radial position of the planetary members to vary in response to variation in the axial separation of the parts of the said one of the two races while maintaining the circumferential connection, characterised in that the planets are composite bodies comprising two roller elements each having an outer surface of revolution for engagement with respective parts of the two races, wherein the connection means between the planetary members and the planet carrier comprises a connector plate having a plurality of slots, each slot having at least a radial component, within each of which a part of a respective planetary member is engaged, and wherein the slots of the connector plate engage respective bushes of the planetary members within which are located rolling element bearings on which the planetary members rotate.

32. A continuously variable transmission device of the type having planetary members in rolling contact with radially inner and outer races each comprising axially spaced relatively axially movable parts, and control means for determining the axial separation of the parts of one of the two races, in which the planetary members are connected for planetary motion to a planet carrier by connection means which allows the radial position of the planetary members to vary in response to variation in the axial separation of the parts of the said one of the two races while maintaining the circumferential connection, characterised in that the planets are composite bodies comprising two roller elements each having an outer surface of revolution for engagement with respective parts of the two races, wherein the curvilinear generatrix of each roller element is an arc of a circle.

33. A continuously variable transmission device according to claim 32, in which the centre of the arc of the circle defining the generatrix for the surface of each roller element is offset axially and/or radially from the mid point of the planet.

34. A continuously variable transmission device of the type having planetary members in rolling contact with radially inner and outer races each comprising axially spaced relatively axially movable parts, and control means for determining the axial separation of the parts of one of the two races, in which the planetary members are connected for planetary motion to a planet carrier by connection means which allows the radial position of the planetary members to vary in response to variation in the axial separation of the parts of the said one of the two races while maintaining the circumferential connection, characterised in that the planets are composite bodies comprising two roller elements each having an outer surface of revolution for engagement with respective parts of the two races, wherein the output shaft extends coaxially around the input shaft and both project from the same side of the housing.

35. A continuously variable transmission device according to claim 34, in which one end of the input shaft opposite the end projecting from the housing has a passageway for the introduction of lubricant.

36. A continuously variable transmission device according to claim 35, in which the lubricant passage has a portion extending radially through the input shaft to the region occupied by the said radially inner race parts.

37. A continuously variable transmission device according to claim 36, in which there are provided positive interengagement means at each end of the row of rolling elements whereby to prevent relative slip between the rolling elements and the race parts in use of the device.

38. A continuously variable transmission device of the type having planetary members in rolling contact with radially inner and outer races each comprising axially spaced relatively axially movable parts, and control means for determining the axial separation of the parts of one of the two races, in which the planetary members are connected for planetary motion to a planet carrier by connection means which allows the radial position of the planetary members to vary in response to variation in the axial separation of the parts of the said one of the two races while maintaining the circumferential connection, characterised in that the planets are composite bodies comprising two roller elements each having an outer surface of revolution for engagement with respective parts of the two races, wherein the two parts of the radially outer race and/or the radially inner race are interconnected by means of a helical coupling, with rolling elements between the two parts to reduce friction.

39. A continuously variable transmission device according to claim 38, in which the positive interengagement means comprise co-operating sets of teeth on the rolling element at the (or each) end of the row thereof and the race parts contacted thereby.

40. A continuously variable transmission device according to claim 39, characterised in that there are provided oil ways through the collars for the passage of lubricating oil, having unidirectional valves opening into an enclosed oil-containing volume defined in part by the respective part of the said other race whereby to provide damping of the motion of the said part of the said other race as it approaches the end stop of the drive transmission member.

41. A continuously variable transmission device according to claim 40 characterised in that the drive transmission member is a central input drive shaft of the device and the said other race is the radially inner race, the two parts of the said radially inner race acting as the cylinder of the damper, with the collars acting as the respective pistons thereof.

42. A continuously variable transmission device according to claim 38, in which the rolling elements themselves have a helical surface conformation for engagement with corresponding helical surface formations on the two race parts between which they are located.

43. A continuously variable transmission device of the type having planetary members in rolling contact with radially inner and outer races each comprising axially spaced relatively axially movable parts, and control means for determining the axial separation of the parts of one of the two races, in which the planetary members are connected for planetary motion to a planet carrier by connection means which allows the radial position of the planetary members to vary in response to variation in the axial separation of the parts of the said one of the two races while maintaining the circumferential connection, characterised in that the planets are composite bodies comprising two roller elements each having an outer surface of revolution for engagement with respective parts of the two races,
  wherein the two roller elements are joined by an intermediate element to which the said connection means is connected, and
  wherein said two intermediate elements of each planetary member are joined to the said connection means by roller bearings.

44. A continuously variable transmission device of the type having planetary members in rolling contact with radially inner and outer races each comprising axially spaced relatively axially movable parts, and control means for determining the axial separation of the parts of one of the two races, in which the planetary members are connected for planetary motion to a planet carrier by connection means which allows the radial position of the planetary members to vary in response to variation in the axial separation of the parts of the said one of the two races while maintaining the circumferential connection, characterised in that the planets are composite bodies comprising two roller elements each having an outer surface of revolution for engagement with respective parts of the two races, wherein the other of the two races is interengaged with an associated drive transmission member (input or output; driving or driven) by a screw coupling of the same hand as that of the said helical coupling, there being respective end stop means for limiting the travel of the associated race part of the said other of the two races in a respective directional sense whereby to permit torque transmission through the device in both senses.

45. A continuously variable transmission device according to claim 44, characterised in that the said end stop means includes means for torsionally interengaging the drive transmission member with the said respective race part in the end-of-travel position thereof.

46. A continuously variable transmission device according to claim 44, characterised in that the said means for torsionally interengaging the said drive transmission member comprises a dog clutch arrangement.

47. A continuously variable transmission device according to claim 46, characterised in that the said dog clutch arrangement has axially extending teeth with inclined crests the angle of inclination of which is determined by reference to the pitch angle of the flights of the screw thread interengagement between the said two race parts and the said drive transmission member.

48. A continuously variable transmission device according to claim 46, characterised in that the said dog clutch arrangement comprises an annular array of axially extending pins or studs on each said part of the said other race and on the said drive transmission member.

49. A continuously variable transmission device according to claim 44, characterised in that the end stop means are carried on respective collars fitted to the said drive transmission means.

\* \* \* \* \*